United States Patent
Chung et al.

(10) Patent No.: US 11,592,866 B2
(45) Date of Patent: Feb. 28, 2023

(54) FUNCTIONAL ASSEMBLY AND ELECTRONIC DEVICE WITH THE FUNCTIONAL ASSEMBLY

(71) Applicant: ASUSTeK COMPUTER INC., Taipei (TW)

(72) Inventors: Cheng-Han Chung, Taipei (TW); Chui-Hung Chen, Taipei (TW); Chia-Min Cheng, Taipei (TW); Ching-Yuan Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 307 days.

(21) Appl. No.: 16/811,114

(22) Filed: Mar. 6, 2020

(65) Prior Publication Data

US 2020/0288002 A1    Sep. 10, 2020

(30) Foreign Application Priority Data

Mar. 8, 2019   (TW) ................. 108202840

(51) Int. Cl.
*G06F 1/16* (2006.01)
*H04M 1/02* (2006.01)

(52) U.S. Cl.
CPC .......... *G06F 1/1624* (2013.01); *G06F 1/1686* (2013.01); *H04M 1/0237* (2013.01); *H04M 1/0264* (2013.01)

(58) Field of Classification Search
CPC .... G06F 1/1624; G06F 1/1686; G06F 1/1626; H04M 1/0237; H04M 1/0264; H04M 2250/20
See application file for complete search history.

(56) References Cited

U.S. PATENT DOCUMENTS

| | | | |
|---|---|---|---|
| 8,641,302 B2 * | 2/2014 | Kao | H04N 5/2257 396/428 |
| 10,063,677 B2 | 8/2018 | Cavallaro et al. | |
| 2012/0092820 A1 | 4/2012 | Hautamaki et al. | |
| 2013/0296094 A1 | 11/2013 | Mack et al. | |
| 2014/0305987 A1 | 10/2014 | Parihar et al. | |
| 2019/0250667 A1 * | 8/2019 | Fan | H04M 1/0237 |
| 2020/0322515 A1 * | 10/2020 | Jia | H04N 5/2257 |

FOREIGN PATENT DOCUMENTS

| | | |
|---|---|---|
| CN | 203535292 U | 4/2014 |
| CN | 208143261 U | 11/2018 |
| EP | 3525436 B1 | 3/2021 |
| TW | 200504454 A | 2/2005 |
| TW | 200725218 A | 7/2007 |
| TW | M511634 U | 11/2015 |
| WO | 2014085483 A1 | 6/2014 |

* cited by examiner

*Primary Examiner* — Nelson D. Hernández Hernández
(74) *Attorney, Agent, or Firm* — McClure, Qualey & Rodack, LLP

(57) ABSTRACT

A functional assembly and an electronic device including the functional assembly are provided. The functional assembly includes a functional module, a motor, and a linking mechanism. The functional module has a first shaft. The motor has a second shaft and is configured to drive the second shaft to rotate. The linking mechanism is connected with the first shaft and the second shaft such that the first shaft and the second shaft are linking-up with each other. As a result, the thickness of the electronic device near the frame is not limited by the size of the motor, which further reduces the thickness of the electronic device.

13 Claims, 11 Drawing Sheets

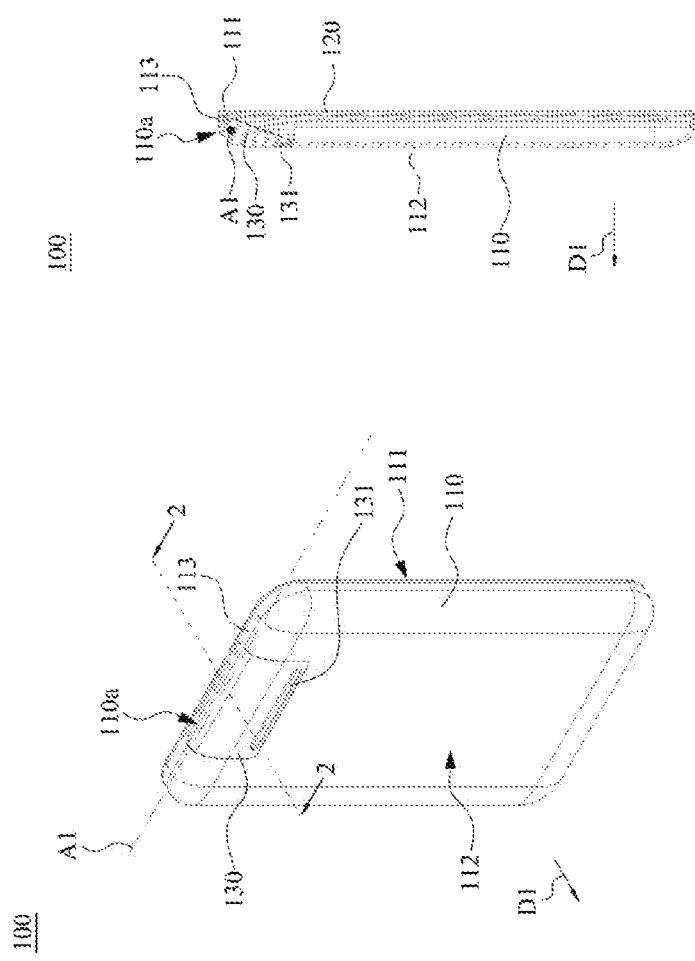

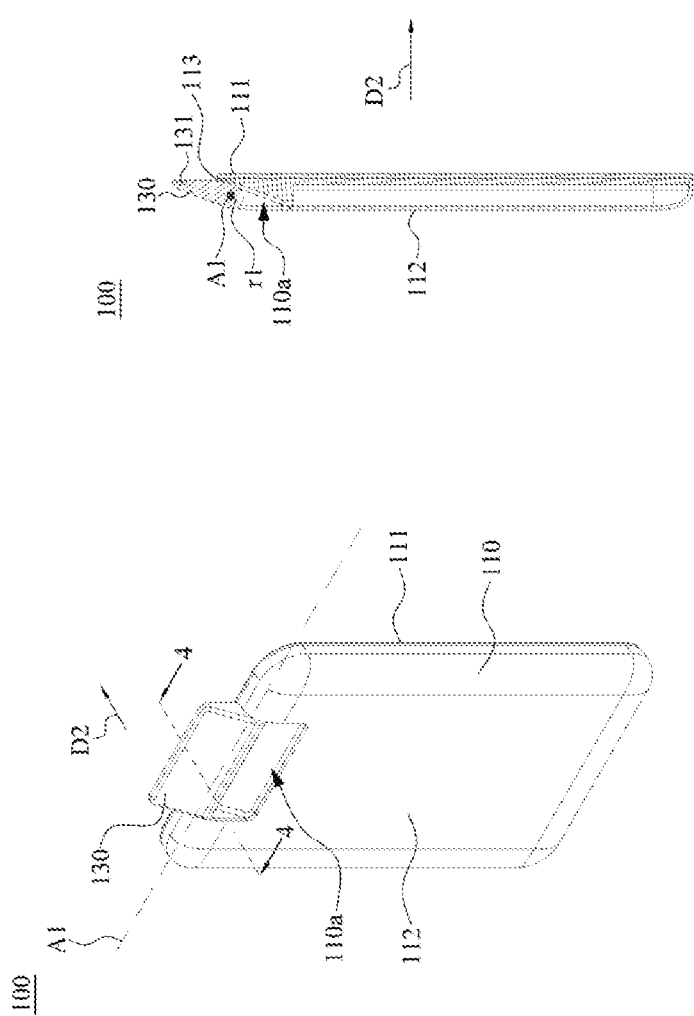

FUNCTIONAL ASSEMBLY AND ELECTRONIC DEVICE WITH THE FUNCTIONAL ASSEMBLY

CROSS-REFERENCE TO RELATED APPLICATION

This application claims the priority benefit of Taiwan applications serial No. 108202840, filed on Mar. 8, 2019. The entirety of the above-mentioned patent application is hereby incorporated by reference herein and made a part of specification.

BACKGROUND OF THE INVENTION

Field of the Invention

The invention relates to a functional assembly and an electronic device with the functional assembly.

Description of the Related Art

Nowadays, full screen displays are gradually used in mobile phones, which makes the accommodating area of the mobile phone for a functional module is reduced. How to provide the internal space of the mobile phone to place the functional module becomes more challenging.

BRIEF SUMMARY OF THE INVENTION

According to the first aspect, a functional assembly is provided. The functional assembly includes: a functional module, including a first shaft; a motor, including a second shaft, and configured to drive the second shaft to rotate; and a linking mechanism, connected with the first shaft and the second shaft such that the first shaft and the second shaft are linking-up with each other by the linking mechanism.

According to the second aspect, an electronic device is provided. The electronic device includes: a display module, located on a first side of the electronic device; and a functional assembly, located on a second side of the electronic device opposite to the first side, wherein the functional assembly comprises: a functional module, including a first shaft; a motor, including a second shaft, and configured to drive the second shaft to rotate; and a linking mechanism, connecting the first shaft and the second shaft such that the first shaft and the second shaft are linking-up with each other by the linking mechanism.

In summary, the functional assembly and the electronic device including the functional assembly are provided. The functional assembly is able to rotate along the first axis to switch between difference modes to perform different functions. In addition, the functional assembly includes the linking mechanism such that the first axis of the functional module is adjacent to the frame of the electronic device and the second axis of the motor is away from the frame of the electronic device. As a result, the thickness of the electronic device near the frame is not restricted by the size of the motor. Therefore, the thickness of the electronic device can be thinner.

These and other features, aspects and advantages of the disclosure will become better understood with regard to the following description, appended claims, and accompanying drawings.

BRIEF DESCRIPTION OF THE DRAWINGS

FIG. 1 is a perspective rear view of an electronic device in a first state according to an embodiment.

FIG. 2 is a cross-sectional view thereof along line 2-2 of FIG. 1.

FIG. 3 is a perspective rear view of an electronic device in a second state according to an embodiment.

FIG. 4 is a cross-sectional view thereof along line 4-4 of FIG. 1.

DETAILED DESCRIPTION OF THE EMBODIMENTS

Figure 5:
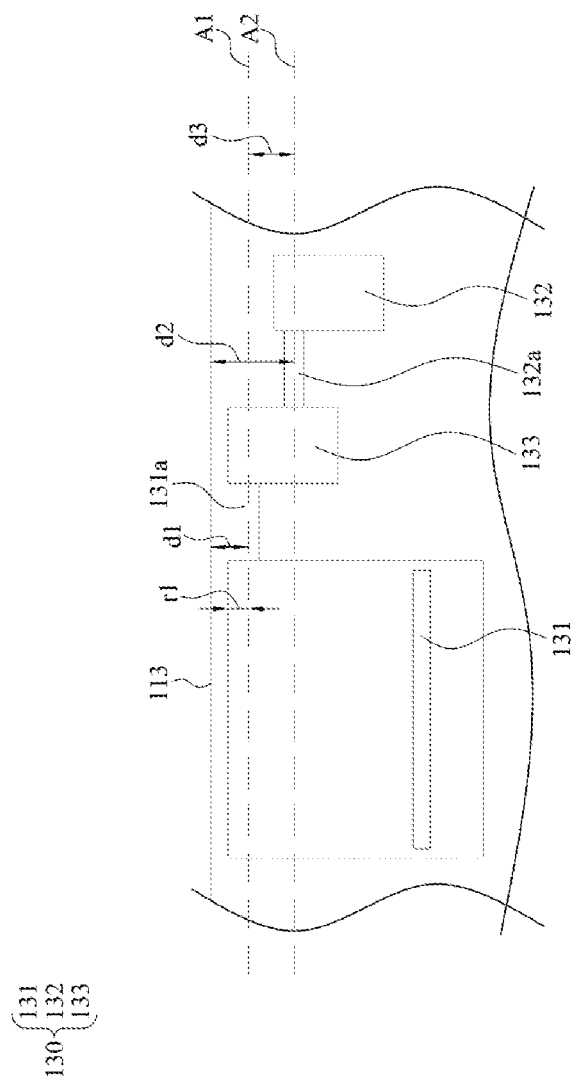
FIG. 5 is a schematic diagram of the internal mechanism of the functional assembly in FIG. 1.

In the following, various embodiments of the disclosure will be disclosed in the accompanying drawings. For the sake of clarity, many practical details will be described in the following description. However, it should be understood that these practical details are not intended to limit the invention. That is to say, in some embodiments of the disclosure, these practical details are not necessary. In addition, some well-known structures and elements are shown in the drawings in a simplified schematic form in the drawings. Furthermore, the same component symbols may be regarded as corresponding components in different drawings unless otherwise indicated. The figures are shown to clearly illustrate the connection between the various elements in these embodiments, not the actual dimensions of the elements.

Please refer to FIG. 1, which is a perspective rear view of an electronic device 100 in a first state according to an embodiment of the disclosure. As shown in FIG. 1, the electronic device 100 includes a body 110, which has a first side 111 and a second side 112 opposite to the first side 111. The second side 112 of the body 110 has a groove 110a. As shown in FIG. 1, the electronic device 100 further includes a display module 120 (please referring to FIG. 2) and a functional assembly 130. The display module 120 is located on the first side 111 of the body 110. The functional assembly 130 is located on the second side 112, accommodated in the groove 110a and partially exposed by the groove 110a. In one embodiment, the vertical projection of the functional assembly 130 accommodated in the groove 110a on the display module 120 completely overlaps the display module 120. In this way, the display module 120 completely covers the first side 111 of the body 110 to achieve a full screen effect.

Please refer to FIG. 2, which is a cross-sectional view along line 2-2 of FIG. 1. As shown in FIG. 2, in the embodiment, the display module 120 is a liquid crystal display (LCD) and located at the first side 111 of the body 110 to display images.

As shown in FIG. 2, the functional assembly 130 includes a functional module 131 to perform various functions. In this embodiment, the functional module 131 is an image capture device for capturing images. As shown in FIG. 1 and FIG. 2, the functional module 131 is exposed by the second side 112 of the electronic device 100. In the embodiment, the functional module 131 is an image capture device, and when the image capture device is exposed by the second side 112 of the electronic device 100, a viewing angle for capturing images is formed alone a first direction D1.

Please refer to FIG. 3 and FIG. 4. In this embodiment, the functional module 131 is rotated along a first axis A1 parallel to a frame 113 of the electronic device 100. The functional module 131 in FIG. 1 is rotated along the first axis A1 for 180 degrees such that the functional module 131 faces away from the second side 112 of the electronic device 100 and has a viewing angle of a second direction D2, and the second direction D2 is opposite to the first direction D1. In other embodiments, the functional module 131 is also rotated at various angles along the first axis A1.

With the above configuration, users perform different functions by rotating the functional module 131. In an embodiment, the functional module 131 includes an image capturing module, and the image capturing module includes at least one function of a capturing function, a laser focusing function, or a sound capturing function. Therefore, when the functional module 131 is located at the second side 112 of the electronic device 100, it serves as a rear lens of the electronic device 100; and when the functional module 131 faces away from the second side 112 of the electronic device 100, it serves as a front lens of the electronic device 100. In this way, the same image capture device is used for both the front lens and the rear lens of the electronic device 100. Therefore, the number of the image capture device is decreased to reduce costs, and the resolutions of the front lens and the rear lens are the same, which solves the problem that the front lens only uses components with lower pixels and smaller lenses due to insufficient space. At the same time, the image capture function of the front side and the rear side shares the same image capture device.

Please refer to FIG. 5, which is a schematic diagram of the internal mechanism of the functional assembly 130 in FIG. 1. As shown in FIG. 5, the functional assembly 130 includes the functional module 131, a motor 132, and a linking mechanism 133. The functional module 131 has a first shaft 131a, and the motor 132 has a second shaft 132a. In the embodiment, the first shaft 131a is parallel to the second shaft 132a, and both the first shaft 131a and the second shaft 132a are parallel to the frame 113. The linking mechanism 133 connects the first shaft 131a and the second shaft 132a such that the first shaft 131a and the second shaft 132a is linking-up with each other by the linking mechanism 133. In other embodiments, the angle between the first shaft 131a and the second shaft 132a can be any angle.

As shown in FIG. 5, when the motor 132 rotates the second shaft 132a, the second shaft 132a rotates along the second axis A2. When the second shaft 132a is rotated, the linking mechanism 133 drives the first shaft 131a to rotate along the first axis A1. Consequently, the motor 132 of the electronic device 100 is rotated by the linking mechanism 133 to drive the functional module 131 to rotate along the first axis A1, to control the functional module 131 to face the first side 111 of the electronic device 100 (FIG. 1) or the second side 112 (FIG. 3).

Refer back to FIG. 4. As shown in FIG. 4, the functional module 131 is pivoted to the position of the first axis A1 with a radius r1. As shown in FIG. 5, the size of the radius r1 is adjusted based on the distance d1 between the first axis A1 and the frame 113. As shown in FIG. 5, in the embodiment, the first axis A1 and the frame 113 are separated by a distance d1, and the radius r1 is approximated by a distance d1.

As shown in FIG. 5, the second axis A2 and the frame 113 are separated by a distance d2, and the distance d1 is less than the distance d2. That is, the first axis A1 and the second axis A2 are separated from each other, and the first axis A1 is closer to the frame 113 than the second axis A2. The electronic device 100 changes the rotational axis, where the functional module 131 is driven by the motor 132 to rotate, from the second axis A2 to the first axis A1 by the linking mechanism 133, thereby reducing the radius r1 of the functional module 131 and the lower thickness of the electronic device 100 effectively.

A first gear 1331A is disposed on the first shaft 131a. The second gear 1332A is disposed on a second shaft 132a (in this embodiment, the second shaft 132a is connected between the motor 132 and the second gear 1332A and covered by the second gear 1332A, but not shown here). The first gear 1331A and the second gear 1332A are engaged with each other.

Figure 6:
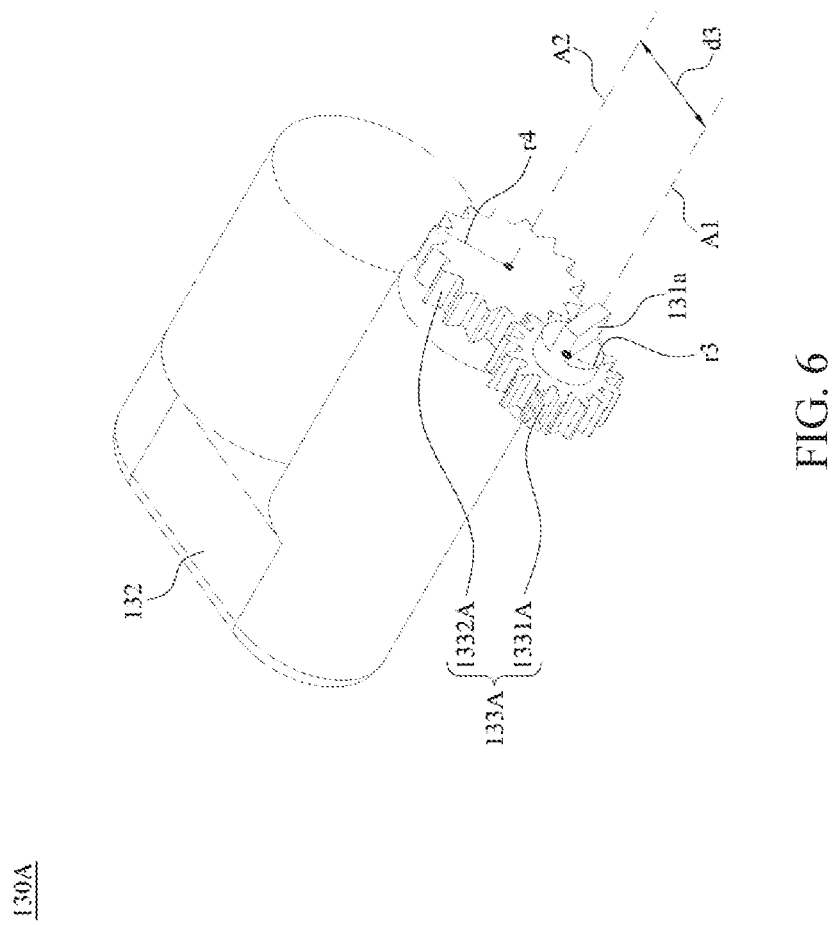
FIG. 6 is a schematic diagram of a linking mechanism of a functional assembly according to an embodiment.

As shown in FIG. 6, the motor 132 drives the second shaft 132a to rotate, then the second shaft 132a drives the second gear 1332A to rotate, and the second gear 1332A drives the first gear 1331A to rotate the first shaft 131a, thus, the functional module 131 (shown in FIG. 5) connected to the first shaft 131a is rotated relative to the first axis A1. Referring to FIG. 5 and FIG. 6, the first axis A1 and the second axis A2 are separated by a distance d3, and the distance d3 is equal to that the distance d2 minus the distance d1. That is, the linking mechanism 133A in the embodiment shown in FIG. 6 successfully converts the rotational axis, where the functional module 131 is driven by the motor 132 to rotate, from the second axis A2 to the first axis A1.

As shown in FIG. 6, the first gear 1331A has a radius r3, and the second gear 1332A has a radius r4. The radius r3 is less than the radius r4. Specifically, the radius r3 of the first gear 1331A is half of the tip diameter of the first gear 1331A, and the radius r4 of the second gear 1332A is half of the outer diameter of the second gear 1332A. That is, the thickness of the part of the electronic device 100 (see FIG. 5) adjacent the first shaft 131a is less than the thickness of the part of the electronic device 100 adjacent the second shaft 132a to reduce the thickness of the frame 113. In an embodiment, the first gear 1331A and the second gear 1332A are designed in an interference fit manner to effectively reduce the tolerance in rotational control.

Figure 7:
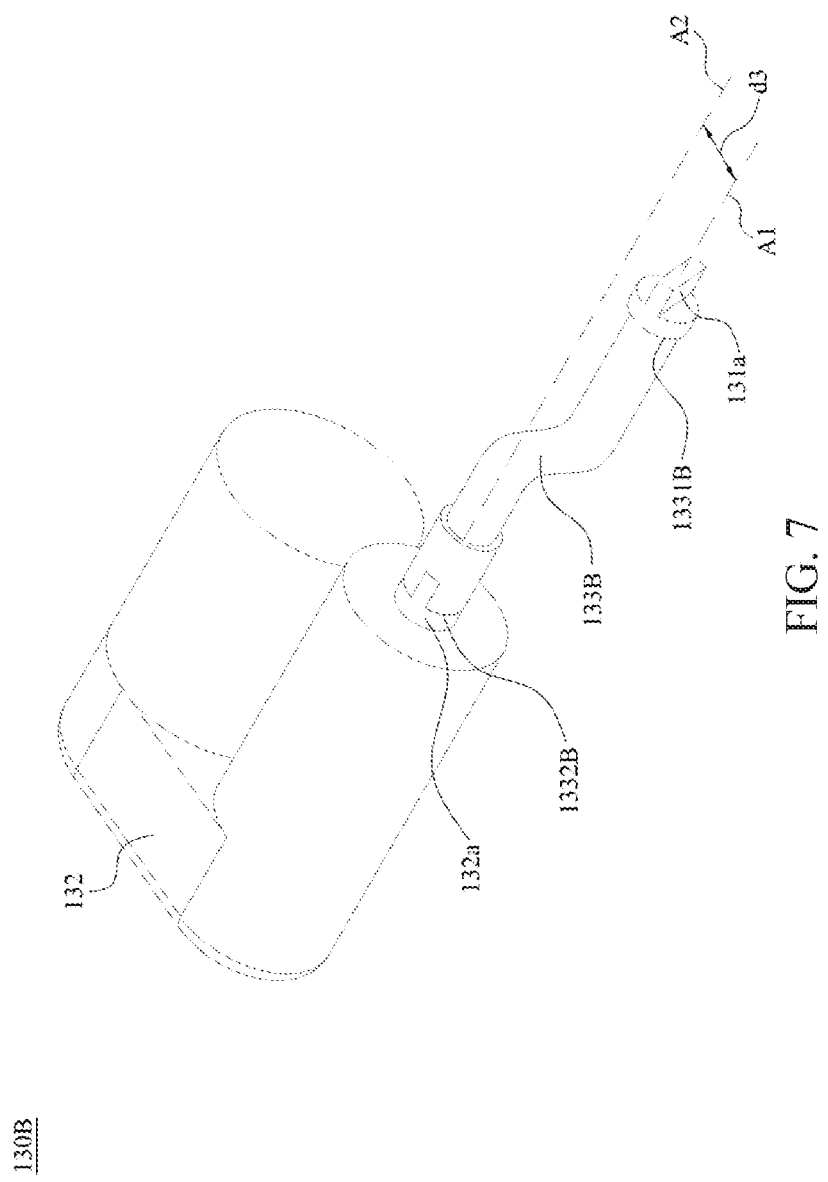
FIG. 7 is a schematic diagram of a linking mechanism of a functional assembly according to another embodiment.

Next, refer to FIG. 7, which is a perspective view of a linking mechanism 133B of a functional assembly 130B according to another embodiment of the disclosure. As shown in FIG. 7, the linking mechanism 133B in the embodiment is a flexible joint. In the embodiment, the flexible joint is a plastic flexible hose, a metal wire, a metal pipe, or a flexible pipe of other material. Specifically, the linking mechanism 133B includes a first end 1331B and a second end 1332B. The first end 1331B is connected to the first shaft 131a. The second end 1332B is connected to the second shaft 132a.

As shown in FIG. 7, the motor 132 drives the second shaft 132a to rotate, the second shaft 132a drives the linking mechanism 133B to rotate, and the linking mechanism 133B drives the first shaft 131a to rotate, which causes the functional module 131 (see FIG. 5) connected with the first shaft 131a to rotate relative to the first axis A1. Referring to FIG. 5 and FIG. 7. The first axis A1 and the second axis A2 are separated by a distance d3, and the distance d3 is equal to that the distance d2 minus the distance d1. That is, in the embodiment shown in FIG. 7, the linking mechanism 133B successfully changes the rotational axis, where the functional module 131 is driven by the motor 132 to rotate, from the second axis A2 to the first axis A1.

Figure 8:
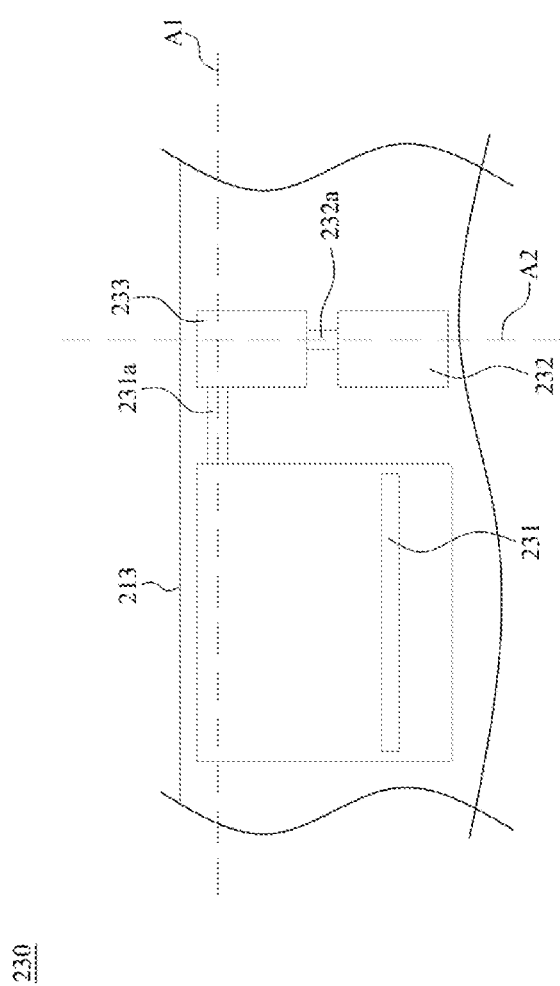
FIG. 8 is a schematic diagram of the internal mechanism of the functional assembly according to another embodiment.

Next, please refer to FIG. 8, which is a schematic diagram of the internal mechanism of the functional assembly 230 according to another embodiment of the disclosure. The difference between the functional assembly 230 of FIG. 8 and the functional assembly 130 of FIG. 5 is that the first axis A1 and the second axis A2 of the functional assembly 230 are perpendicular to each other. In other embodiments, the angle between the first axis A1 and the second axis A2 is not limited herein.

As shown in FIG. 8, the first shaft 231a of the functional module 231 is perpendicular to the second shaft 232a of the motor 232, and the motor 232 is located under the linking mechanism 233 such that the motor 232 is further away from the frame 213. Thus, the thickness of the frame 213 of the electronic device 200 is not restricted by the size of the motor 232.

Figure 9:
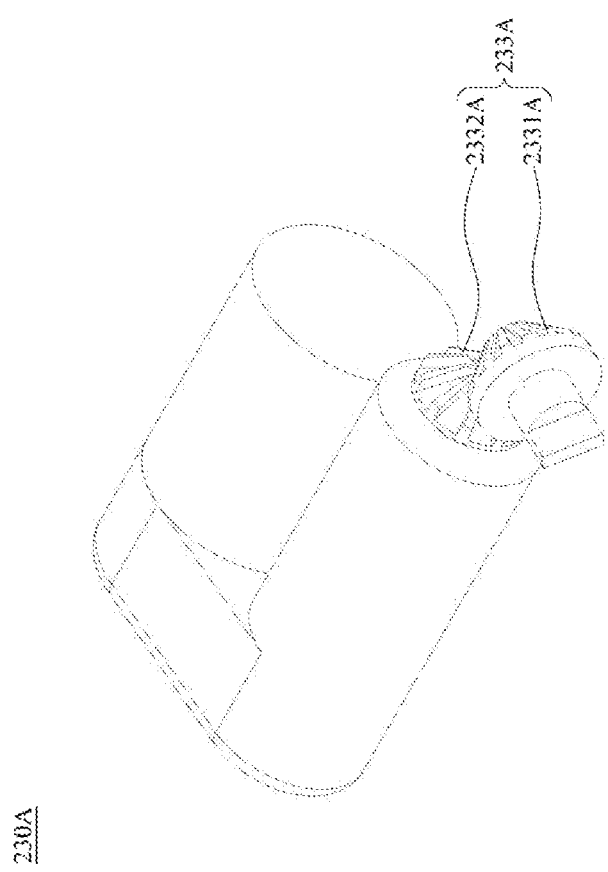
FIG. 9 is a perspective view of a linking mechanism of a functional assembly according to an embodiment.

Please refer to FIG. 8 to FIG. 9, which is a perspective view of a linking mechanism 233A of a functional assembly 230A according to an embodiment of the disclosure. The linking mechanism 233A of FIG. 9 includes a first gear 2331A and a second gear 2332A. The first gear 2331A is disposed on the first shaft 231a, the second gear 2332A is disposed on the second shaft 232a, and the first gear 2331A and the second gear 2332A are engaged perpendicularly to each other. In other embodiments, the first gear 2331A and the second gear 2332A are engaged with each other at any angle. In an embodiment, the first gear 2331A and the second gear 2332A are designed in an interference fit manner to effectively reduce the tolerance in rotational control.

It should be understood that the first gear 2331A and the second gear 2332A shown in FIG. 9 are merely for examples. In other embodiments, the first gear 2331A and the second gear 2332A are bevel gears, friction wheels or other vertically engageable gear structure, which is not limited herein.

Figure 10:
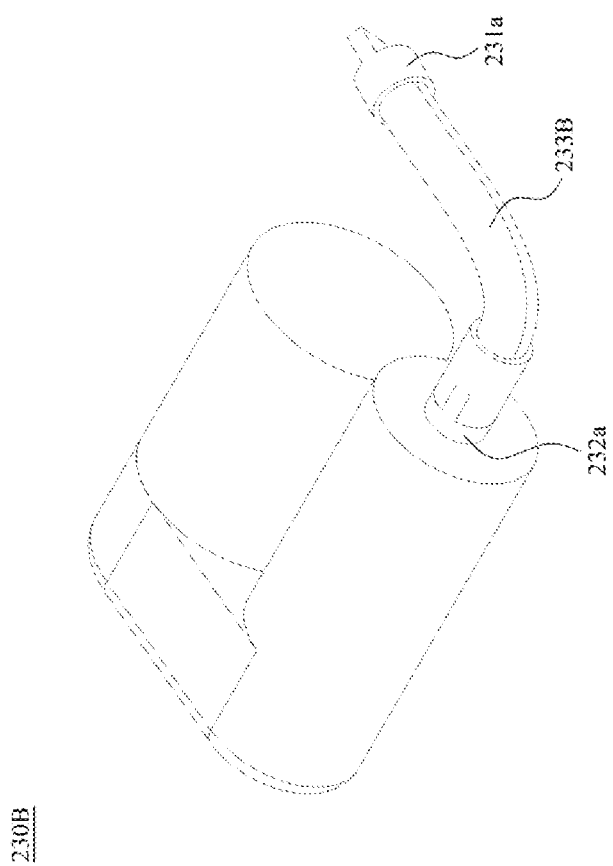
FIG. 10 is a perspective view of a linking mechanism of a functional assembly according to an embodiment.

Please refer to FIG. 10, which is a perspective view of a linking mechanism 233B of a functional assembly 230B according to an embodiment of the disclosure. As shown in FIG. 10, the linking mechanism 233B in the embodiment is a flexible joint. The linking mechanism 233B of FIG. 10 is similar to the linking mechanism 133B of FIG. 7, and the difference between FIG. 10 and FIG. 7 is that the first shaft 231a and the second shaft 232a in FIG. 10 are perpendicular to each other.

Figure 11:
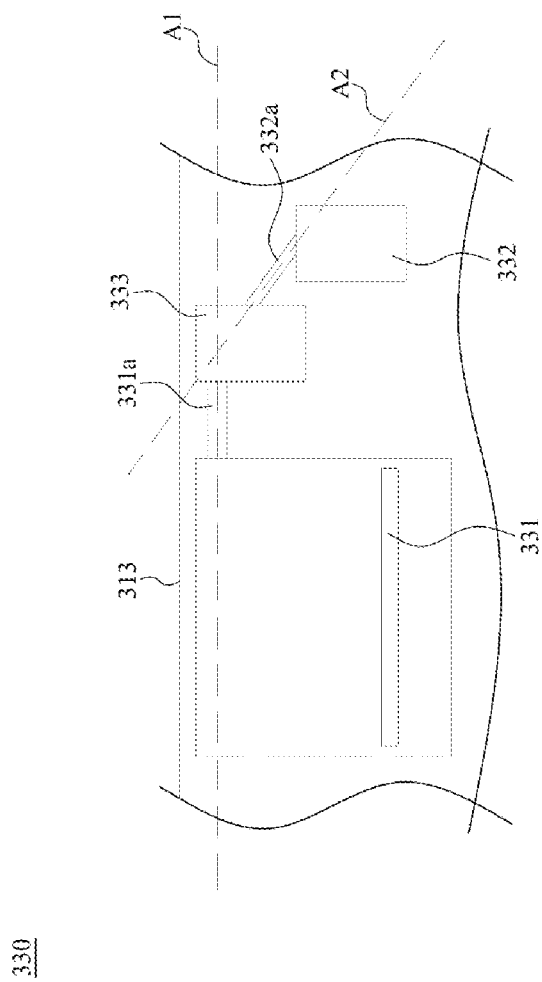
FIG. 11 is a schematic diagram of the internal mechanism of the functional assembly according to further another embodiment.

Next, please refer to FIG. 11, which shows a schematic diagram of the internal mechanism of a functional assembly 330 according to further another embodiment of the disclosure. The difference between FIG. 11 and FIG. 8 is that the angle between the first axis A1 and the second axis A2 in FIG. 11 is non-right angle. That is, the first axis A1 and the second axis A2 of the functional assembly 330 are not parallel and are not perpendicular to each other.

Figure 12:
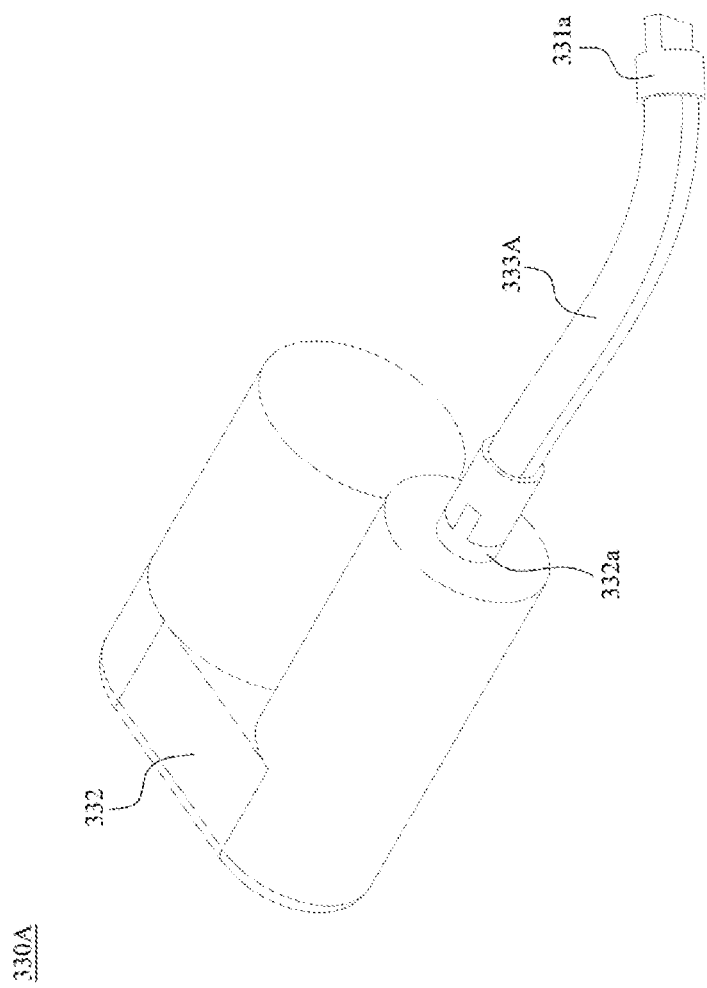
FIG. 12 is a perspective view of a linking mechanism of a functional assembly according to an embodiment.

Specifically, please refer to FIG. 12, which is a perspective view of a linking mechanism 333A of a functional assembly 330A according to an embodiment of the disclosure. The linking mechanism 333A of FIG. 12 is similar to the linking mechanism 133B of FIG. 7 and the linking mechanism 233B of FIG. 10, mechanism 333A is a flexible joint with a flexible pipe of plastic, metal or other material, the difference between the linking mechanism 333A and linking mechanism 133B is that the angle between the first shaft 331a and the second shaft 332a in FIG. 12 is non-right angle.

As shown in FIG. 12, the user bends the flexible joint according to practical requirements to adjust the direction of the first shaft 331a and change the angle between the first shaft 331a and the second shaft 332a. In this way, there are extra internal space of the electronic device 300 for easy placing the motor 332 in the electronic device 300.

Figure 13:
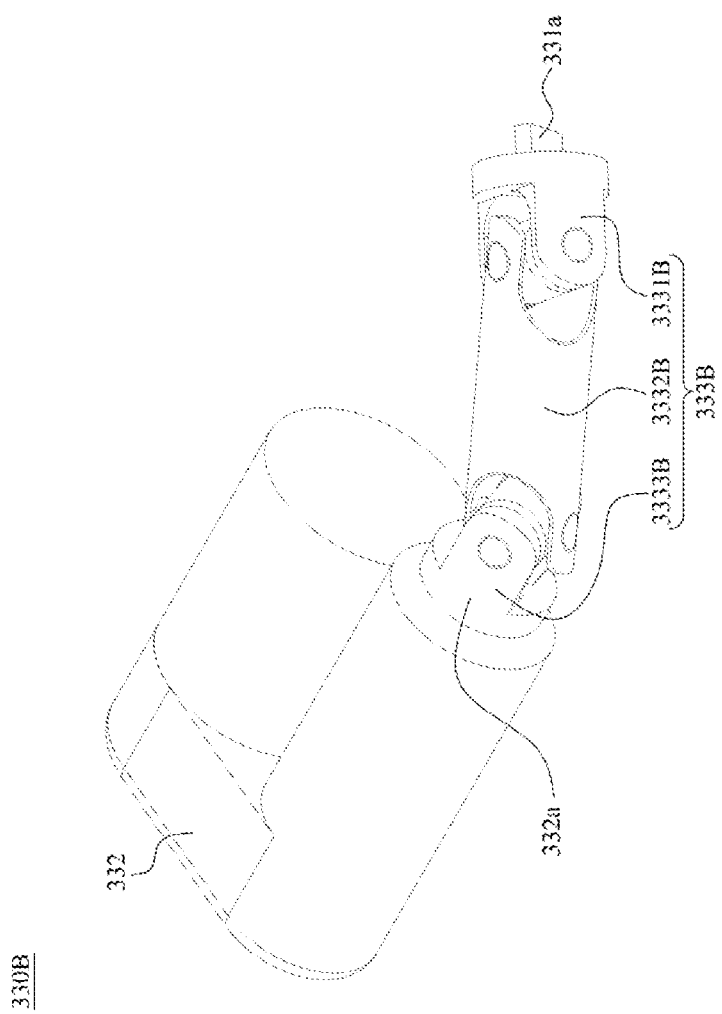
FIG. 13 is a perspective view of a linking mechanism of a functional assembly according to an embodiment.

Next, please refer to FIG. 13, which is a perspective view of a functional mechanism of a functional assembly according to an embodiment of the disclosure. As shown in FIG. 13, the linking mechanism 333B in this embodiment is a universal joint. Specifically, the linking mechanism 333B includes a first linkage 3331B, a second linkage 3332B, and a third linkage 3333B. One end of the first linkage 3331B is connected to the first shaft 331a, and the other end of the first linkage 3331B is connected to the second linkage 3332B, and the angle between the first linkage 3331B and the second linkage 3332B is changeable. One end of the third linkage 3333B is connected to the second shaft 332a and the other end of the third linkage 3333B is connected to the second linkage 3332B, and the angle between the third linkage 3333B and the second linkage 3332B is also changeable.

As shown in FIG. 13, the motor 332 drives the second shaft 332a to rotate, the second shaft 332a drives the third linkage 3333B to rotate, the third linkage 3333B drives the second linkage 3332B to rotate, the second linkage 3332B drives the first linkage 3331B to rotate, and the first linkage 3331B n drives the first shaft 331a to rotate, such that the functional module 331 (see FIG. 11) connected to the first shaft 331a rotates along the first axis A1.

It should be understood that the embodiments shown in FIG. 12 and FIG. 13 are for example only, and those skilled in the art may use other configurations to implement the configuration shown in FIG. 11. In an embodiment, the bevel gear (or friction wheel) in FIG. 9 is used as the linking mechanism 333, and the angles of the tops of the two bevel gears is adjusted to adjust the angle between the first shaft 331a and the second shaft 332a, for increasing the extra internal space of the electronic device 300 to easily dispose the motor 332 in the electronic device 300.

In summary, the functional assembly and the electronic device including the functional assembly are provided in the disclosure. The functional assembly rotates along the first axis to switch between difference modes to perform different functions. In addition, the functional assembly includes the linking mechanism such that the first axis of the functional module is adjacent to the frame of the electronic device and the second axis of the motor is away from the frame of the electronic device. As a result, the thickness of the electronic device near the frame is not limited by the size of the motor. Therefore, the thickness of the electronic device can be thinner.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A functional assembly, comprising:
   a functional module, including a first shaft, wherein the functional module is pivoted to a position of a first axis with a radius;
   a motor, including a second shaft, and configured to drive the second shaft to rotate along a second axis, wherein the radius is less than a distance between the first axis and the second axis; and
   a linking mechanism, connected with the first shaft and the second shaft such that the first shaft and the second shaft are linking-up with each other by the linking mechanism.

2. The functional assembly according to claim 1, the functional module comprising an image capture device.

3. The functional assembly according to claim 1, wherein when the motor rotates the second shaft, the second shaft rotates along the second axis, and when the second shaft is rotated, the linking mechanism drives the first shaft to rotate along the first axis.

4. The functional assembly according to claim 3, wherein the first axis is parallel to the second axis, and the first axis and the second axis are separated by a distance.

5. The functional assembly according to claim 1, wherein the linking mechanism further comprising:
   a first gear, located on the first shaft; and
   a second gear, located on the second shaft, and the first gear is engaged with the second gear.

6. The functional assembly according to claim 5, wherein the radius of the first gear is less than the radius of the second gear.

7. An electronic device, comprising:
   a display module, located on a first side of the electronic device; and
   a functional assembly, located on a second side of the electronic device opposite to the first side, wherein the functional assembly comprises:
   a functional module, including a first shaft, wherein the functional module is pivoted to a position of a first axis with a radius;
   a motor, including a second shaft, and configured to drive the second shaft to rotate along a second axis, wherein the radius is less than a distance between the first axis and the second axis; and
   a linking mechanism, connecting the first shaft and the second shaft such that the first shaft and the second shaft are linking-up with each other by the linking mechanism.

8. The electronic device according to claim 7, the functional module comprising an image capture device.

9. The electronic device according to claim 7, wherein when the motor rotates the second shaft, the second shaft rotates along the second axis, and when the second shaft is rotated, the linking mechanism drives the first shaft to rotate along the first axis.

10. The electronic device according to claim 9, wherein the motor drives the functional module to rotate along the first axis by the linking mechanism, to control the functional module to face to the first side or the second side.

11. The electronic device according to claim 9, wherein the first axis is parallel to the second axis, and the first axis and the second axis are separated by a distance.

12. The electronic device according to claim 7, the linking mechanism further comprising:
   a first gear, disposed on the first shaft; and
   the second gear, disposed on the second shaft, and the first gear is engaged with the second gear.

13. The electronic device according to claim 12, wherein the radius of the first gear is less than the radius of the second gear.

* * * * *